United States Patent
Fan et al.

(10) Patent No.: US 12,519,189 B2
(45) Date of Patent: Jan. 6, 2026

(54) THERMALLY DISCONNECTING HIGH POWER BUSBARS FOR BATTERY SYSTEM PROPAGATION CONTROL

(71) Applicant: Bell Textron Inc., Fort Worth, TX (US)

(72) Inventors: Yue Fan, Fort Worth, TX (US); Michael R. Hull, Fort Worth, TX (US); Charles E. Covington, Colleyville, TX (US); Brian J. Cox, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 968 days.

(21) Appl. No.: 17/573,409

(22) Filed: Jan. 11, 2022

(65) Prior Publication Data
US 2023/0223665 A1 Jul. 13, 2023

(51) Int. Cl.
*H01M 50/00* (2021.01)
*H01H 85/02* (2006.01)
*H01M 10/0525* (2010.01)
*H01M 50/522* (2021.01)
*H01M 50/581* (2021.01)
*H01M 50/583* (2021.01)

(52) U.S. Cl.
CPC ...... *H01M 50/581* (2021.01); *H01H 85/0241* (2013.01); *H01M 10/0525* (2013.01); *H01M 50/522* (2021.01); *H01M 50/583* (2021.01); *H01M 2200/103* (2013.01)

(58) Field of Classification Search
CPC ............ H01M 50/574; H01M 50/581; H01M 2200/10; H01M 50/591; H01M 50/505; H01M 10/0525; H01H 85/00; H01H 85/0047
See application file for complete search history.

(56) References Cited

U.S. PATENT DOCUMENTS

| | | | |
|---|---|---|---|
| 10,573,876 B1 * | 2/2020 | Zeng ................... | H01M 50/55 |
| 2019/0036101 A1 * | 1/2019 | Tyler .................. | H01M 50/505 |
| 2020/0112012 A1 * | 4/2020 | Fernandez-Galindo ..................... | H01M 50/503 |
| 2020/0212385 A1 * | 7/2020 | Shi ...................... | H01M 50/258 |

(Continued)

FOREIGN PATENT DOCUMENTS

| KR | 20160081016 A | * | 7/2016 | .......... H01M 50/581 |
|---|---|---|---|---|
| KR | 20210039052 A | * | 4/2021 | .......... H01M 50/581 |

OTHER PUBLICATIONS

Larry Steckler, Radio-Electronics, 1961, Gemsback Publications, vol. 32, p. 50 (Year: 1961).*

(Continued)

*Primary Examiner* — Tiffany Legette
*Assistant Examiner* — Douglas C Marroquin
(74) *Attorney, Agent, or Firm* — Frost Brown Todd LLP (57) ABSTRACT

A battery system is described with methods and systems for thermally isolating a battery module experiencing thermal runaway. In one embodiment, a thermal actuator can cut a busbar coupling neighboring battery modules together, thereby preventing or slowing the spread of thermal runaway. In other embodiments, a fusible material can joint portions of a busbar. High temperatures can cause the fusible material to melt off of the busbar portions and thereby break the thermal or electrical conductivity between busbar portions and neighboring modules.

9 Claims, 9 Drawing Sheets

(56) References Cited

U.S. PATENT DOCUMENTS

2020/0220143 A1* 7/2020 Yang .................. H01M 50/581
2022/0407188 A1* 12/2022 Shin .................. H01M 50/524

OTHER PUBLICATIONS

Larry Steckler, Radio-Electronics, 1961, Gemsback Publications, vol. 32, p. 50 (Year: 1961) (Year: 1961).*
Merriam-Webster, definition of spring (Year: 2021).*

* cited by examiner

THERMALLY DISCONNECTING HIGH POWER BUSBARS FOR BATTERY SYSTEM PROPAGATION CONTROL

TECHNICAL FIELD

The present disclosure is directed to electric battery systems.

BACKGROUND OF THE INVENTION

There is a greater need and demand for electric vehicles. This is creating a greater need for bigger battery packs. Battery systems, such as lithium-ion batteries, can be segmented to prevent single cell fires from spreading to the entire system. However, in tightly packed battery systems, higher temperatures in one segment or module can easily spread to other segments or modules. To prevent fires, and for general safety and reliability of battery systems, there is a need for means to prevent the spread of fire or overheated batteries.

BRIEF SUMMARY OF THE INVENTION

One embodiment under the present disclosure comprises a battery system. Said battery system can comprise: a first battery module comprising a first terminal and a second battery module comprising a second terminal. It can further comprise a busbar coupling the first and second terminals, the busbar comprising a first portion coupled to the first terminal and a second portion coupled to the second terminal, the first and second portions joined by a fusible material; wherein the busbar and the fusible material are configured to provide conductivity between the first and second modules and wherein the fusible material is configured to melt and break the conductivity when a temperature of the busbar reaches an unsafe temperature.

Another embodiment under the present disclosure comprises a coupling system for coupling battery modules in a battery system. The system can comprise a busbar configured to be coupled to a first terminal of a first battery module and a second terminal of a second battery module; and an actuator coupled to the busbar and configured to prevent the conductivity of the busbar when a temperature reaches an unsafe level.

Another embodiment under the present disclosure comprises a method of thermally isolating thermal runaway in a battery system. The method can comprise conducting electricity between a first and second battery module by a busbar and detecting a temperature in the battery system. Furthermore, if the temperature reaches a predetermined temperature, preventing conductivity between the first and second battery modules by the busbar.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Overheating and fires pose dangers to battery systems, including lithium-ion batteries and other technologies used in modern electric vehicles. It is common to segment various modules within a battery system. This can help prevent single cell 101 fires from spreading to other modules within the system. However, the energy demands of modern electric vehicles are increasing while battery packs tend to be large and heavy. There is therefore a need for batteries of lighter weight and smaller footprint—making segmentation more difficult. Furthermore, many components of batteries are meant to conduct electricity. Materials that conduct electricity often conduct heat as well—increasing fire risks. In tightly packaged battery systems, battery modules are close together and copper busbars between battery module segments can become a heat transfer path during fire. While it's possible to thermally segment certain components of the battery structure using thermally insulating non-metal materials, that is not possible in the case of busbars that require materials with very high electrical conductivity. The current disclosure includes embodiments of separation means to break or alter the busbar connection between battery components/modules.

Figure 1:
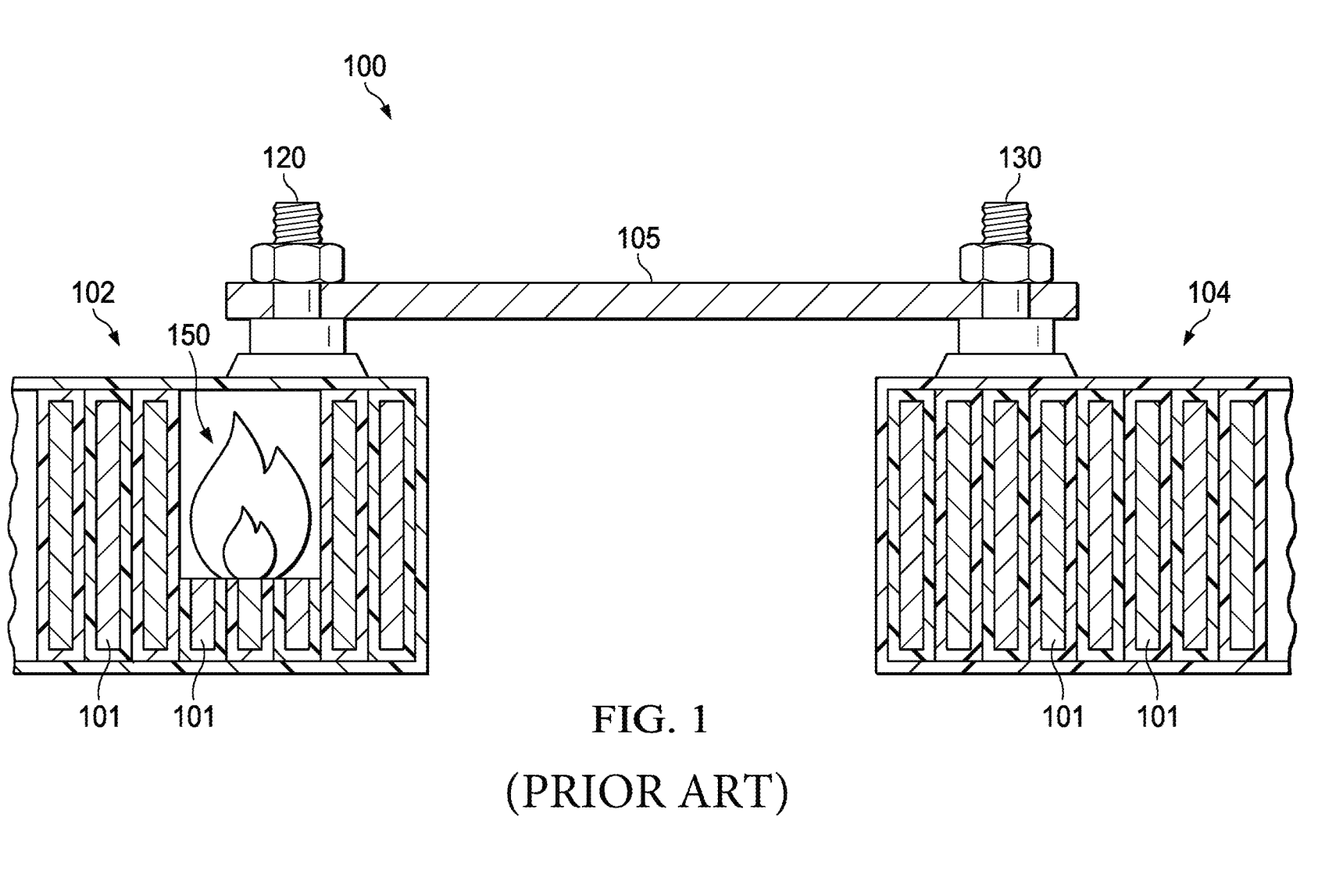
FIG. 1 is a diagram of a prior art busbar and battery system embodiment.

FIG. 1 shows a typical battery system, such as used in electric vehicles. Battery modules 102, 104 are shown. The segmentation between modules 102, 104 can help isolate any fire 150 that occurs. However, because weight and space are at a premium in electric vehicles, the modules 102, 104 are still close to each other. Furthermore, busbar 105 connects to modules 102, 104 via terminals 120, 130. As module 102, with fire 150, increases in temperature the busbar will conduct heat to module 104. A fire in module 104 can result, or increased temperature can degrade module 104. Heat and/or fire can similarly spread to further modules.

Some of the prior art solutions to thermal runaway have limitations. Electrical thermal fuses work via melting its conductive element, however, the melting location is highly localized and generated by $I^2R$ heating, and thus not effective in the situation shown in FIG. 1. Thermal fuses use engineered reduced cross section areas or purposely electrically lossy (increased resistivity) materials to generate heat during overcurrent events in order to melt the fusing material. This introduces mechanical weakness, additional heat during normal operation, and non-negligeable efficiency losses to the system. Thermal fuses are also physically large for high voltage systems due to design for arc suppression. Pyrotechnic switches are traditionally used to stop overcurrent events and are not designed for reaction to a multitude of cell temperature sensors.

Figure 2:
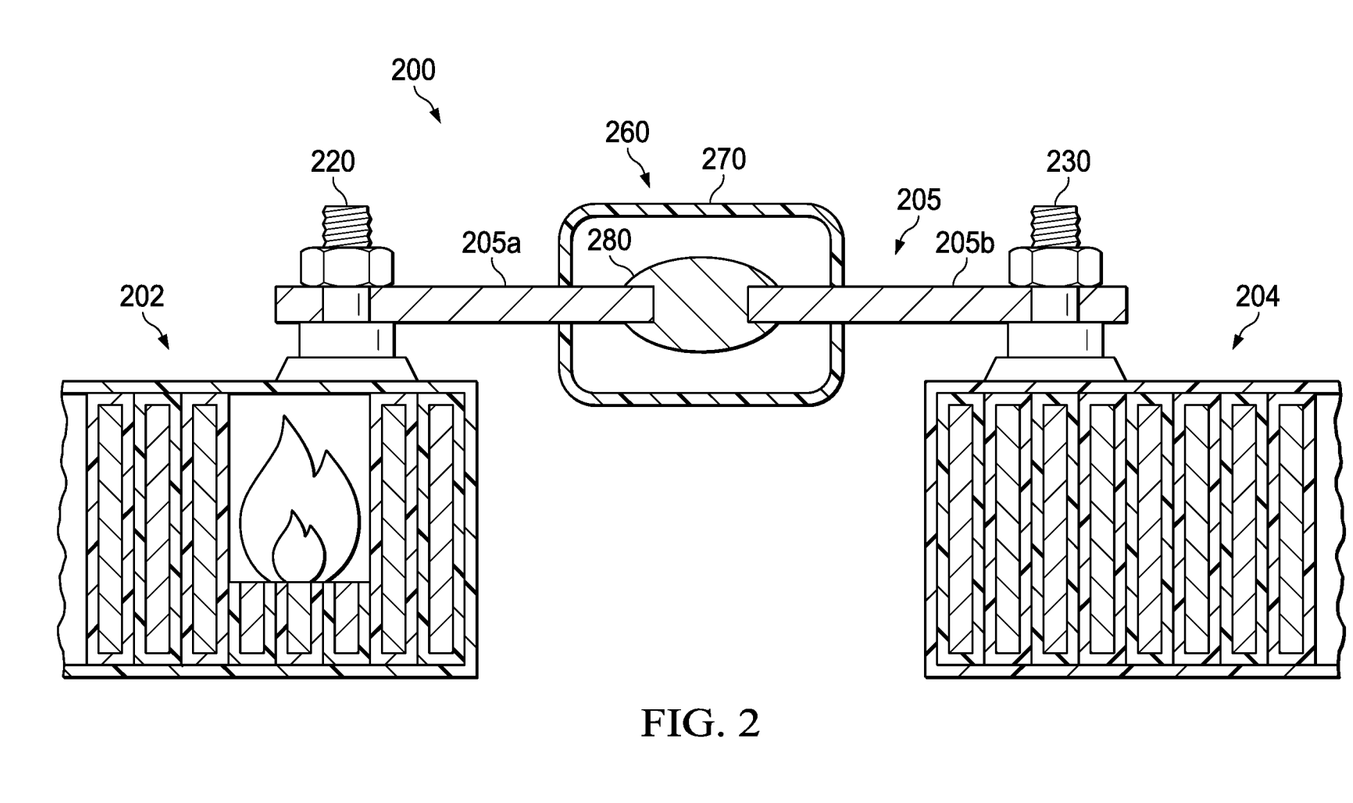
FIG. 2 is a diagram of a battery system under the present disclosure using fusible material.

One embodiment under the present disclosure is shown in FIG. 2. Battery system 200 comprises at least modules 202 and 204. Module 202 is experiencing thermal runaway such as fire or overheating. Busbar 205 comprises portions 205*a*, 205*b* and connects to modules 202, 204 at terminals 220, 230. Thermal disconnect 260 comprises a middle portion of busbar 205. Thermal disconnect 260 comprises a housing 270 around fusible material 280. As thermal runaway occurs in module 202, busbar 205 and fusible material 280 will undergo a temperature increase. By choosing a suitable material for fusible material 280, the temperature rise can melt fusible material 280, which will then fall into the housing 270 and thereby interrupt the thermal conductivity between modules 202, 204. By choosing a proper fusible material, the user can determine a desired melting temperature. A low melting temperature material is suitable for preventing excessive heat transfer, while the exact melting temperature and thermal mass can be tuned for the desired excursion temperature and normal operation duty cycle as well as the chosen cell electrochemistry. Some advantages of this embodiment include that it responds to temperatures below short circuit but above normal operating temperatures, and prevents excessive thermal transfer from a thermal runaway battery module to adjacent battery modules. It is also compact and not sized to break short circuit arcing. It is also self-contained—not needing controls signals. In addition, the housing 270 prevents molten metal or sparks from escaping into environment, and provides constraint during assembly.

Embodiments under the current disclosure can have the fusible material 280 melt responsive to external heat (namely that of a battery module undergoing thermal runaway), therefore these embodiments can be mechanically stable and not overly lossy. This is in contrast, for example, to thermal fuses. The $I^2R$ heating and lossy functionality of thermal fuses, described above, are avoided.

Types of fusible material used can vary depending on a user's needs. Melting temperature, electrical conductivity, thermal conductivity, and other factors may impact what material is chosen. Tin, lead, and silver (and others) are possible materials. Tin has a melting temperature of 232° C. and electrical conductivity of 8.7 (MS/m). Lead has a melting temperature of 327° C. and electrical conductivity of 4.7 (MS/m). An alloy of 98% tin and 2% silver (98Sn, 2Ag), has a melting temperature of 221 to 226° C. and electrical conductivity similar to tin. Depending on the type of battery used, or other components or materials used, a melting temperature of 232° C. might be preferred. Other situations may necessitate a melting temperature of 370° C., and a fusible material can be selected that fits the respective situation. Different battery technologies, as well as various components, have different heat tolerances. The fusible material for one battery may not work for another battery.

Materials for the busbar 205 are typically copper or aluminum. These materials have a higher melting temperature than tin, for example. This will allow the busbar to withstand the temperatures that might melt the fusible material. Other materials are possible for the busbar.

Figure 3:
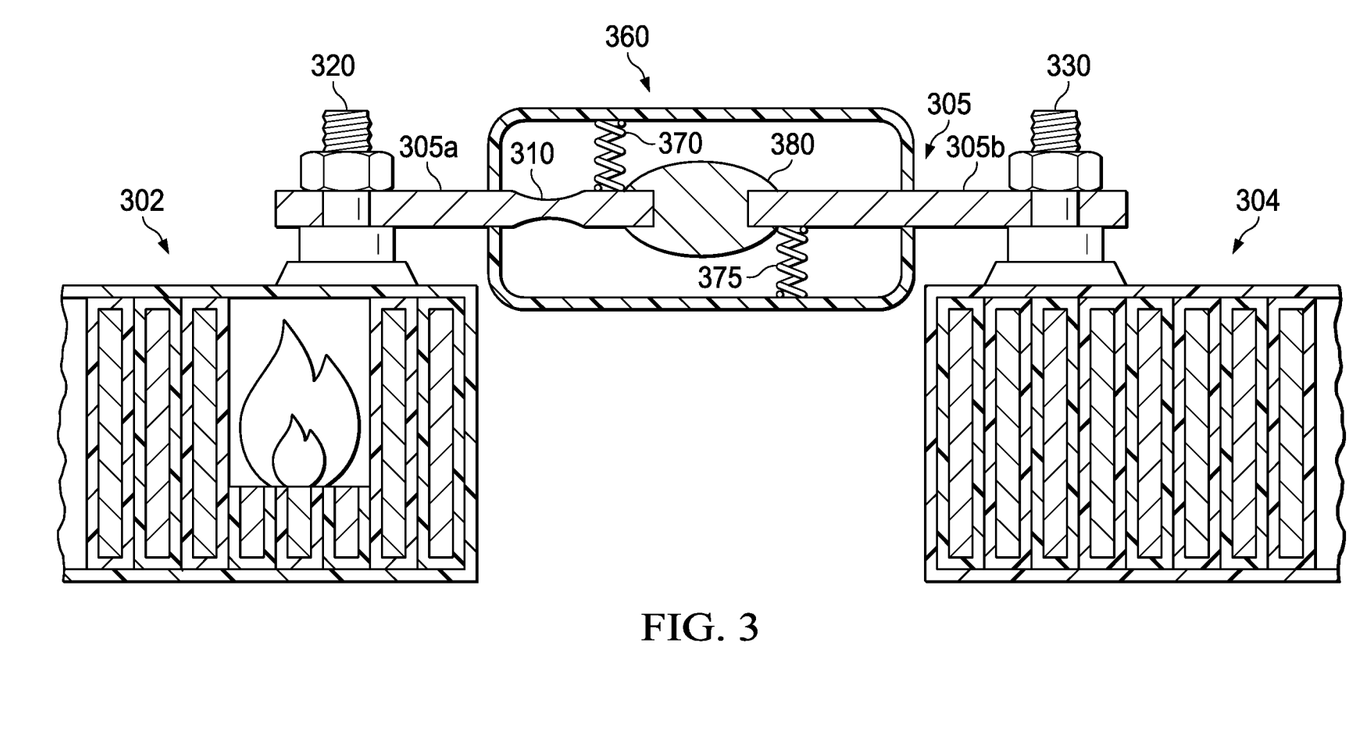
FIG. 3 is a diagram of a battery system under the present disclosure using fusible material and springs.

FIG. 3 shows a similar embodiment to FIG. 2 but with the addition of springs that can assist in breaking the electrical and thermal conductivity between battery modules. In FIG. 3, battery modules 302, 304 are coupled by busbar 305 connected to terminals 320, 330. Busbar 305 comprises a first portion 305*a* coupled to terminal 320 and second portion 305*b* coupled to terminal 330. Housing 360 houses a fusible material 380 that couples first and second portions 305*a/b*. Spring 370 is coupled to the first portion 305*a* and spring 375 is coupled to the second portion 305*b*. Once a temperature is reached at the fusible material 380 that melts fusible material 380, then the electrical and/or thermal conductivity between portions 305*a/b* will be broken. Now that the fusible material 380 has melted, or weakened because of the temperature, the force of spring 370 can push or pull first portion 305*a*. The force of spring 375 can push or pull second portion 305*b*. This can assist in separating first and second portions 305*a/b* away from each other, ensuring a broken connection for electrical or thermal conductivity. Other embodiments may only utilize one spring, or more than two springs. A variety of spring arrangements are possible beyond the specific layout shown in FIG. 3. The stiffness of the busbar portions 305*a/b* may vary by embodiment. In some cases the springs 370, 375 may need to be relatively strong to move the busbar portions 305*a/b*. In other cases, with weaker busbar portions 305*a/b* the springs 370, 375 may not need to be as strong in order to flex or move the busbar portions 305*a/b*. An optional engineered flex point 310 may also be implemented in busbar portions 305*a/b*, making it easy for a spring 370, 375 to move the busbar portions 305*a/b* in a chosen direction. Flex point 310 may comprise grooves, thinner material, or other means making flex of the busbar portions 305*a/b* easier.

Figure 4:
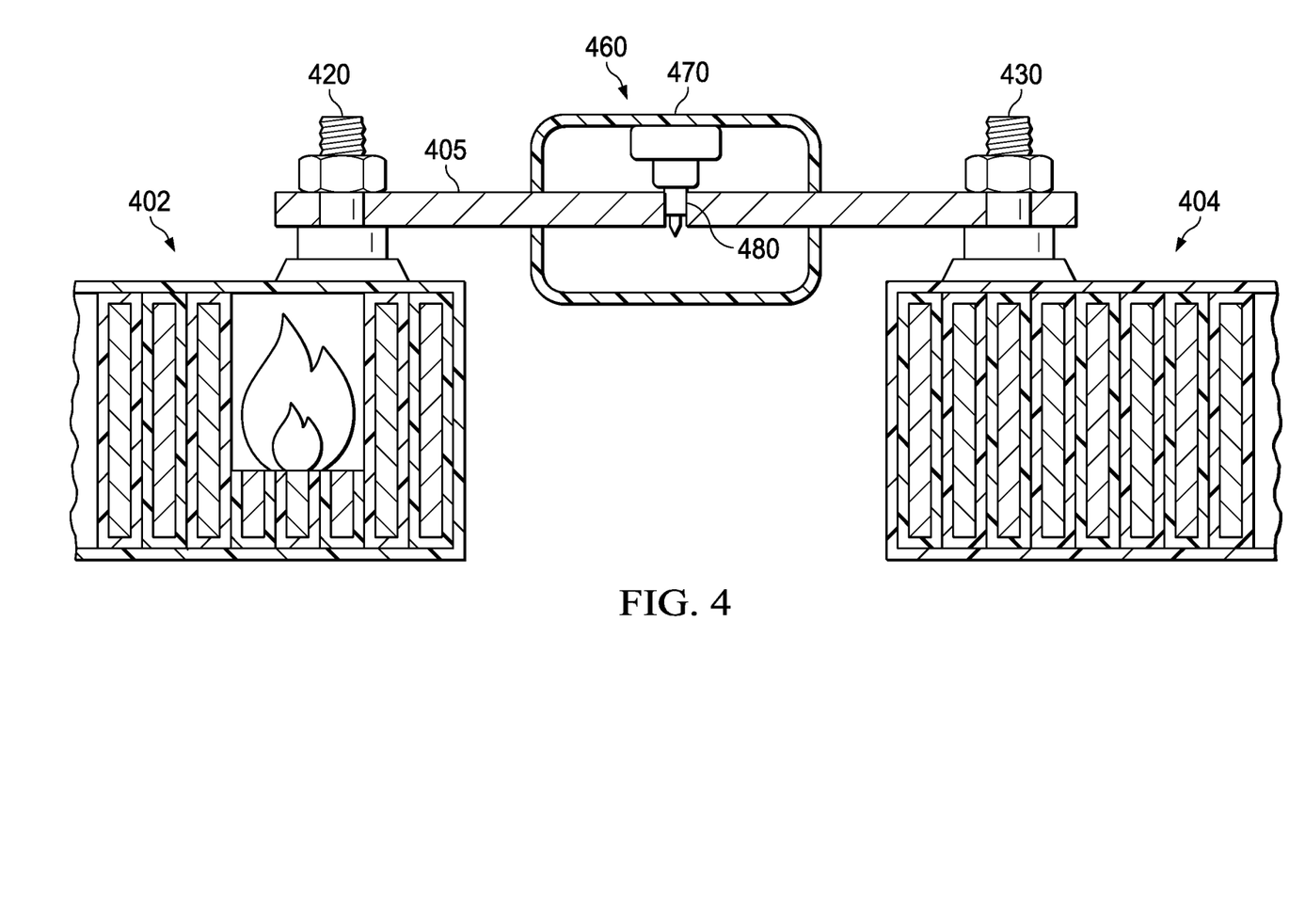
FIG. 4 is a diagram of a battery system under the present disclosure using a thermal actuator.

FIG. 4 shows a further possible embodiment under the present disclosure. In FIG. 4 module 402 is coupled to module 404 by busbar 405 via terminals 420, 430. Busbar 405 is coupled to a thermal actuator 460. Thermal actuator 460 comprises a point 480 and a housing 470. As thermal runaway occurs in module 402, heat is conducted along busbar 405 thereby heating thermal actuator 460. At a certain temperature, depending on the specific embodiment, thermal actuator 460 will be triggered to actuate point 480 so as to cut or mechanically separate the busbar 405. Heat transfer via the busbar 405 will therefore be ended or minimized. Thermal actuator 460 can comprise a thermally reactive device to drive the point 480, or an electric solenoid can be used. Other means are possible. An electric solenoid would preferably be connected to a controller or sensor. There are often sensors in a battery system or module that could be coupled to the electric solenoid, or the electric solenoid could comprise integrated sensors, such as for temperature. Thermal actuator can comprise a linear actuator coupled to point 480. Point 480 could also comprise a worm gear or worm screw that is configured to cut the busbar 405. Generally, the embodiment of FIG. 4 can allow for more precision in temperature limits when compared to the embodiment of FIG. 2.

Figure 5:
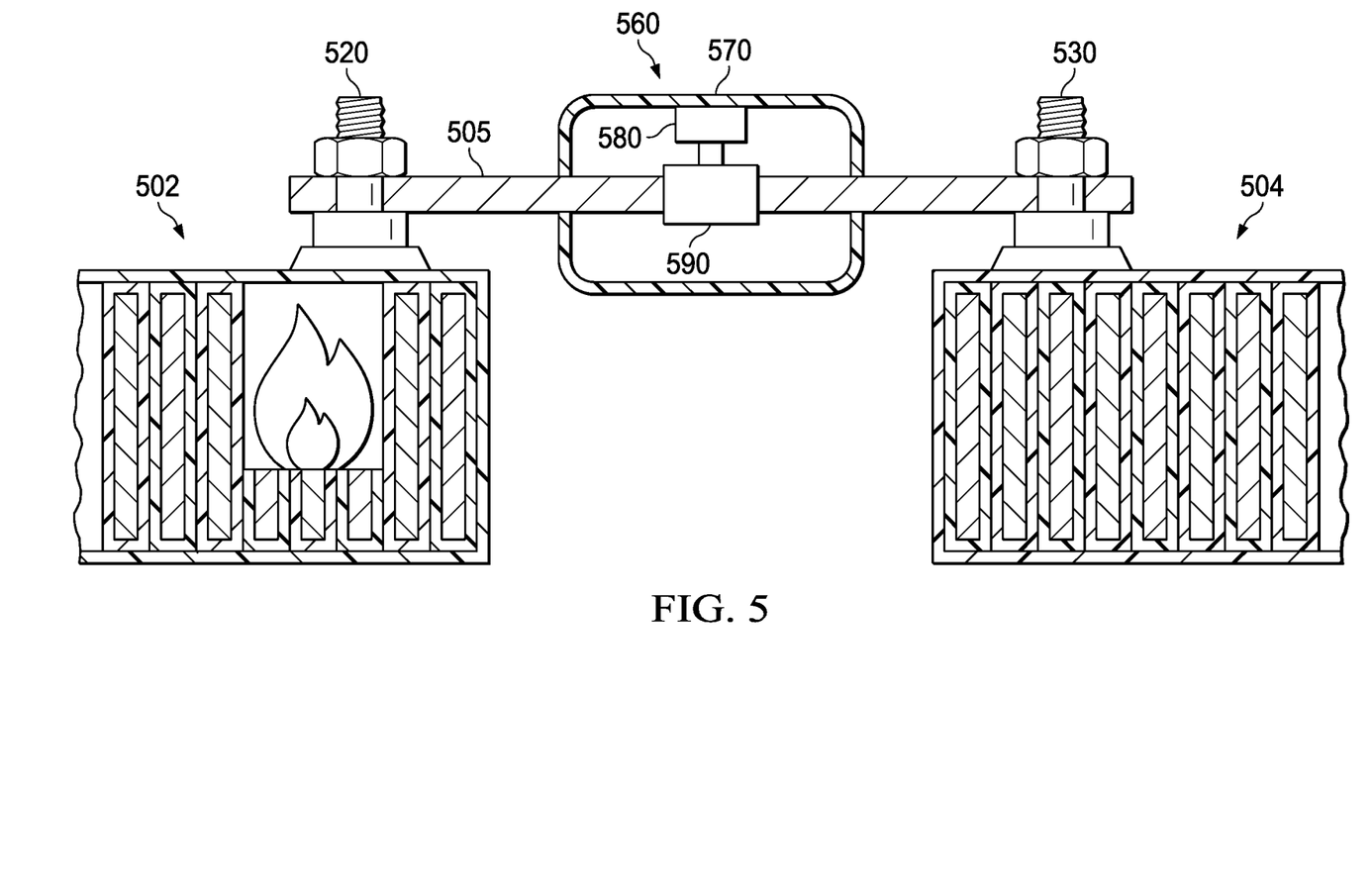
FIG. 5 is a diagram of a battery system under the present disclosure using a thermal actuator.

FIG. 5 shows a similar embodiment to FIG. 4. A module 502 can be undergoing thermal runaway. Module 502 can be coupled to module 504 via terminals 520, 530 and busbar 505. Thermal actuator 560 provides a connection in the middle of busbar 505 between terminals 520, 530. Housing 570 houses actuator point 580 and contactor 590. During normal operation contactor 590 maintains the coupling between terminals 520, 530 by busbar 505. However, when thermal actuator 560 is triggered by a high temperature (e.g., 300° C. in some embodiments), actuator point 580 pushes contactor 590 downward or otherwise out of its position. This breaks the coupling by busbar 505 and thermally isolates the modules 502, 504. The pushing of contactor 590 out of position can be a permanent break, or a temporary one in which actuator point 580 and contactor 590 can move back into position once the temperature lowers to a safe level.

Figure 6:
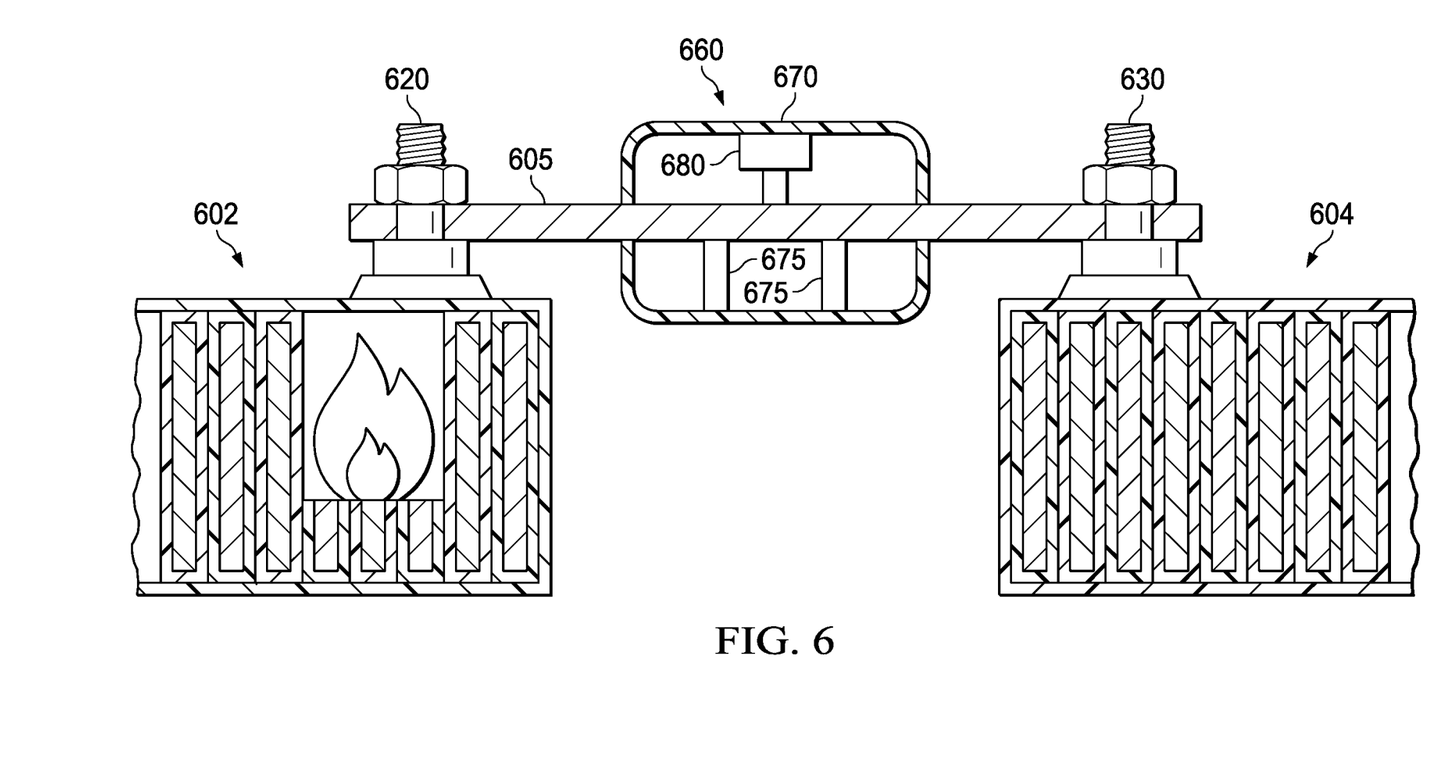
FIG. 6 is a diagram of a battery system under the present disclosure using a thermal actuator.

FIG. 6 shows a similar embodiment to FIG. 4. Modules 602, 604 are coupled via busbar 605 and terminals 620, 630. Thermal actuator 660 sits between the terminals 620, 630. In some embodiments, busbar 605 may be hard to break or puncture with actuator point 680. In this version, brackets 675 are coupled to housing 670 and help to provide a counter force, allowing actuator point 680 to break busbar 605 with less force (compared to no brackets 675). This embodiment may be useful where busbar 605 needs to be stronger, such as when the only conductive material with the desired thermal properties is harder for the thermal actuator to break. Or in some embodiments maybe the desired thermal actuator 660 and actuator point 680 have limited power for breaking busbar 605. A variety of brackets 675 or counter force providing structures are possible. Another possible embodiment could shape the busbar 605 so as to make it easier to cut, break or puncture. For example, within housing 670 the busbar 605 could be narrowed or tapered, along any axis, so that it's dimensionally smaller and easier to cut, break, or puncture.

One benefit of the thermal actuator embodiments described herein, such as in FIG. 4-6, is that they can function in zero-gravity situations. The embodiment of FIG. 2, with fusible material, may not work in every zero-gravity environment. Melting the fusible materials can break the connection in the busbar. But in zero-gravity the fusible material might float within the housing of the actuator and inadvertently continue providing electrical connection between modules or terminals. Thermal actuator embodiments, by breaking a connection along the busbar, and with no fusible material to float around, can avoid such problems in zero-gravity.

Figure 7:
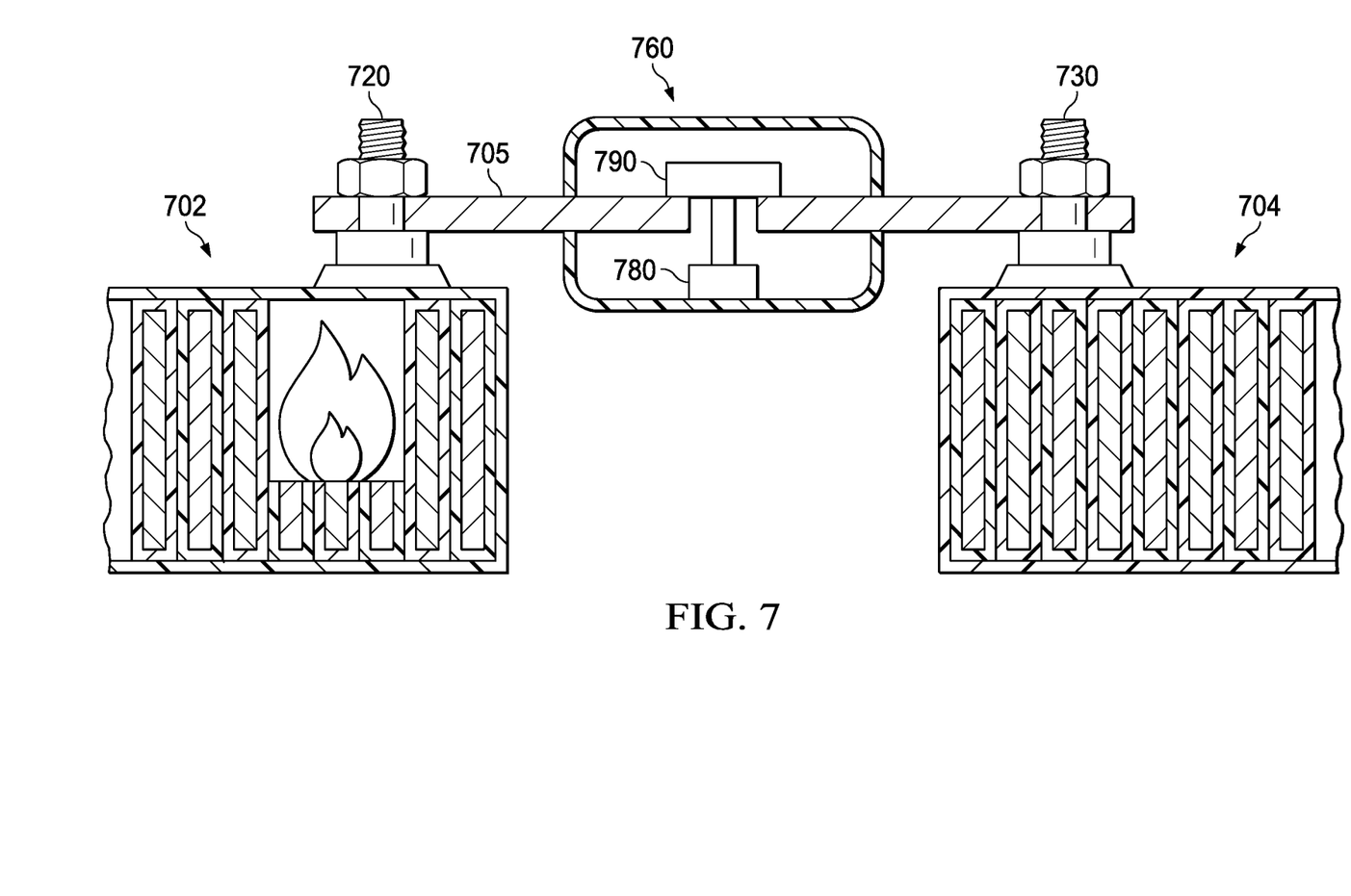
FIG. 7 is a diagram of a battery system under the present disclosure using a thermal actuator.

FIG. 7 shows another embodiment of a contactor 790. In this embodiment, modules 702, 704 are coupled via busbar 705 and terminals 720, 730. Thermal actuator 760 couples portions of busbar 705 together via contactor 790. When the temperature of thermal actuator 760 or busbar 705 reaches a certain temperature then thermal actuator 760 will move actuator 780 so as to move contactor 790 upward (in this embodiment) and out of contact with busbar 705, breaking the electrical connection between modules 702, 704 and helping to isolate thermal runaway in either module 702, 704.

Figure 8:
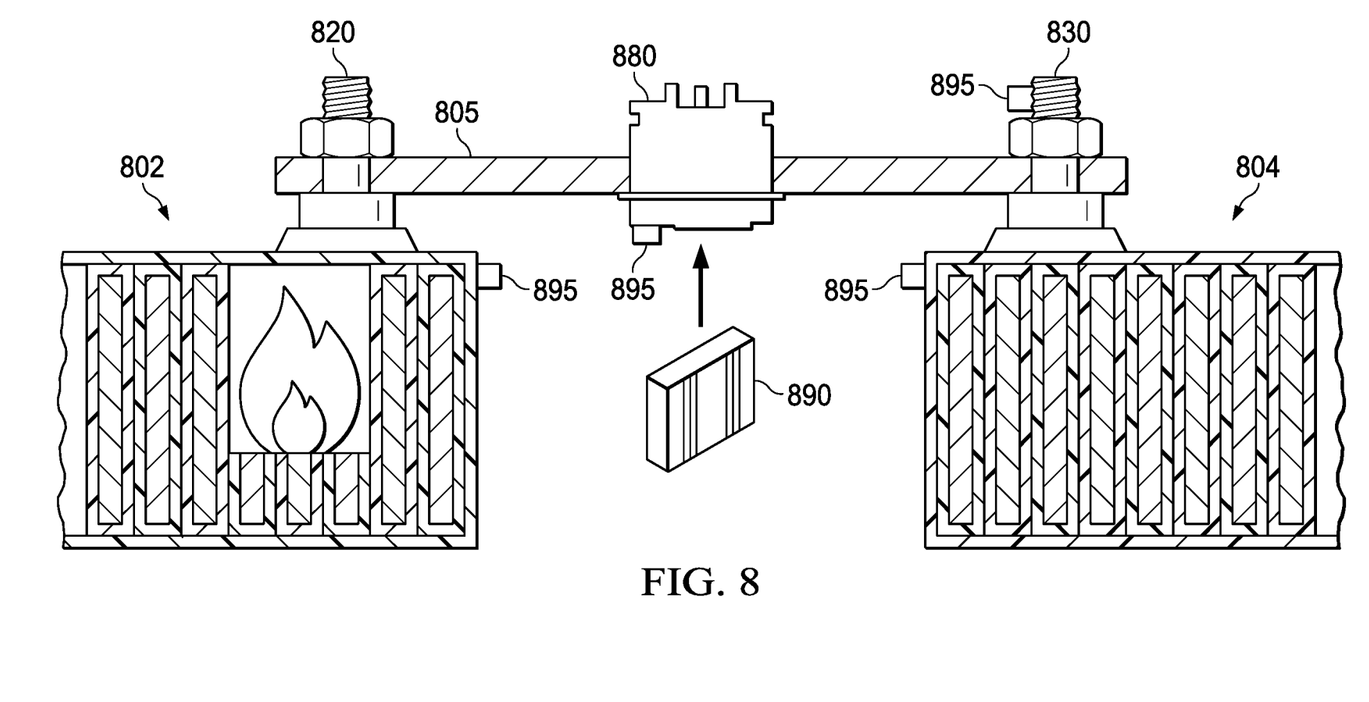
FIG. 8 is a diagram of a battery system under the present disclosure using a pyrotechnic switch.

A further embodiment, shown in FIG. 8, can comprise a pyrotechnic switch. In FIG. 8 a module 802 can be experiencing thermal runaway. Coupling to neighboring module 804 is via busbar 805 and terminals 820, 830. Pyrotechnic switch 880 resides on the busbar 805. Controller 890 can be coupled to pyrotechnic switch 880 or comprise a portion thereof and can be coupled to temperature sensors 895. Temperature sensors 895 can be located in various portions of a battery module or module system. Pyrotechnic switch 880 can be powered by the busbar 805 or can comprise a battery or another power supply connection. Controller 890 can sample the temperature at one or more locations in the system via temperature sensors 895. When a chosen or preset temperature level is reached the controller 890 can communicate with the pyrotechnic switch 880 to mechanically or electrically separate the busbar 805. Some advantages of a pyrotechnic switch include being able to reduce or stop loading prior to busbar separation to reduce device size and mass. Another advantage is that a user or designer can coordinate with other optimizations such as electrically bypassing a thermal runaway battery module to continue short operation. The actuator, or mechanical or electrical means of separation within pyrotechnic switch can comprise any of the means described elsewhere in the present disclosure. An actuator can break the busbar, such as in FIG. 4, a contactor can be moved, such as in FIG. 5, or any other means described herein can be combined with the pyrotechnic switch embodiment shown in FIG. 8.

Figure 9:
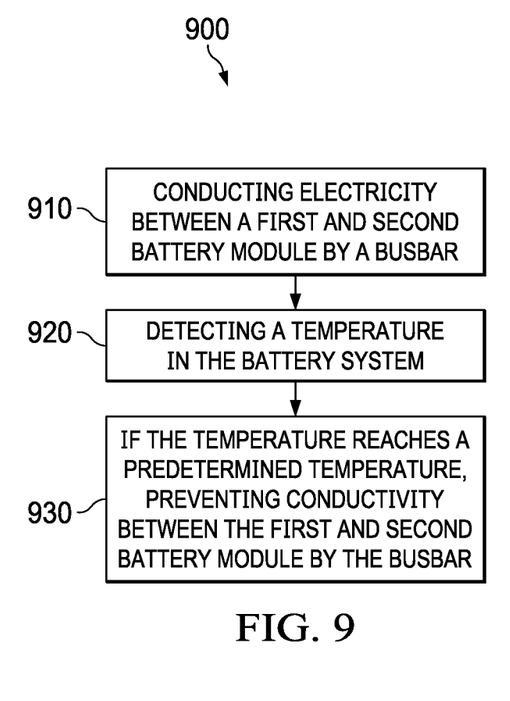
FIG. 9 is a diagram of a method embodiment under the present disclosure.

FIG. 9 shows a possible method claim under the present disclosure. Method 900 comprises a method of thermally isolating thermal runaway in a battery system. Step 910 is conducting electricity between a first and second battery module by a busbar. Step 920 is detecting a temperature in the battery system. Step 930 is, if the temperature reaches a predetermined temperature, preventing electrical conductivity between the first and second battery modules by the busbar. Method 900 can utilize any of the means discussed herein for prevent electrical conductivity between the first and second battery modules. Thermal actuators, fusible material, pyrotechnic switch, contactor between busbar portions, and more are all possible.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A battery system comprising: a first battery module comprising a first terminal, the first battery module being configured to experience thermal runaway; a second battery module comprising a second terminal; a housing including at least one spring; and a busbar coupling the first and second terminals, the busbar comprising a first portion coupled to the first terminal and a second portion coupled to the second terminal, the first and second portions joined by a fusible material, the busbar including a flexible portion which is thinner than surrounding portions of the busbar, the flexible portion being within the housing; wherein the busbar and the fusible material are configured to provide conductivity between the first and second modules and wherein the fusible material is positioned proximate the first battery module such that the fusible material is configured to melt in order to break the conductivity when the first battery module experiences the thermal runaway, wherein the at least one spring contacts the busbar and is thereby configured to flex the flexible portion upon the fusible material melting, wherein the fusible material is configured to prevent the spring from flexing the flexible portion before the fusible material is melted, wherein the at least one spring comprising a first spring coupled to the first portion and a second spring coupled to the second portion, wherein when the fusible material melts, the first and second springs are configured to move the first and second portions away from each other.

2. The battery system of claim 1 the housing at least substantially surrounding the fusible material.

3. The battery system of claim 1 wherein the fusible material comprises tin.

4. The battery system of claim 1 wherein the first battery module comprises lithium sulfur batteries.

5. The battery system of claim 1 wherein the busbar comprises copper.

6. The battery system of claim 1 wherein the first battery module comprises lithium-ion batteries.

7. The battery system of claim 1 wherein the at least one spring is configured to move the first portion away from the second portion within the housing.

8. A battery system comprising: a first battery module comprising a first terminal; a second battery module comprising a second terminal; a busbar coupling the first and second terminals, the busbar comprising a first portion coupled to the first terminal and a second portion coupled to the second terminal, the first and second portions joined by a fusible material, wherein the first and second portions are configured to bias away from each other; and a housing comprising a body and at least one spring, the housing surrounding the fusible material, wherein the at least one spring is configured to bias the first and second portions away from each other by being positioned against the body, wherein the housing is further configured to contain the fusible material; wherein the busbar and the fusible material are configured to provide conductivity between the first and second modules and wherein the fusible material is configured to melt in order to break the conductivity when a temperature of the fusible material reaches a predetermined temperature, wherein the fusible material is further configured to resist the first portion and the second portion from biasing away from each other, wherein the at least one spring includes two springs on opposing ends of the body.

9. The battery system of claim 8 wherein the fusible material comprises tin.

* * * * *